(12) United States Patent
Liu et al.

(10) Patent No.: US 10,423,731 B2
(45) Date of Patent: Sep. 24, 2019

(54) SIMULATING THE EFFECTS OF RUPTURE DISK FAILURE ON ANNULAR FLUID EXPANSION IN SEALED AND OPEN ANNULI

(71) Applicant: Landmark Graphics Corporation, Houston, TX (US)

(72) Inventors: Zhengchun Liu, Sugar Land, TX (US); Robello Samuel, Cypress, TX (US); Adolfo Gonzales, Houston, TX (US); Yongfeng Kang, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/902,242

(22) PCT Filed: May 7, 2015

(86) PCT No.: PCT/US2015/029689
§ 371 (c)(1),
(2) Date: Dec. 30, 2015

(87) PCT Pub. No.: WO2016/118181
PCT Pub. Date: Jul. 28, 2016

(65) Prior Publication Data
US 2017/0316121 A1  Nov. 2, 2017

Related U.S. Application Data

(60) Provisional application No. 62/107,099, filed on Jan. 23, 2015.

(51) Int. Cl.
*G06F 17/50* (2006.01)
*E21B 41/00* (2006.01)
(Continued)

(52) U.S. Cl.
CPC .......... *G06F 17/5009* (2013.01); *E21B 41/00* (2013.01); *E21B 41/0092* (2013.01);
(Continued)

(58) Field of Classification Search
CPC .. G06F 17/5009; G06F 17/11; G06F 2217/16; E21B 41/0092; E21B 34/063; E21B 41/00
See application file for complete search history.

(56) References Cited

U.S. PATENT DOCUMENTS

2002/0139536 A1  10/2002  Staudt
2003/0010503 A1  1/2003  Staudt
(Continued)

OTHER PUBLICATIONS

Zhengchun Liu, Robello Samuel, Adolfo Gonzales, Yongfeng Kang; Modeling and Simulation of Annular Pressure Buildup (APB) Mitigation Using Rupture Disk; 13 pages (Year: 2016).*
(Continued)

*Primary Examiner* — S. Sough
*Assistant Examiner* — Kimberly L Jordan
(74) *Attorney, Agent, or Firm* — Polsinelli PC (57) ABSTRACT

A method for simulating the effects of rupture disk failure on annular fluid expansion in sealed and open annuli to mitigate annular pressure buildup in a wellbore comprises the steps of: determining whether an internal region or an external region for a pair of casing string annuli is open; and calculating at least one of an adjusted internal annular pressure buildup and an adjusted external annular pressure buildup for at least one of the internal annular region and the external annular region of the casing string annuli.

20 Claims, 8 Drawing Sheets

(51) Int. Cl.
*G06F 17/11* (2006.01)
*E21B 34/06* (2006.01)
(52) U.S. Cl.
CPC ............ *G06F 17/11* (2013.01); *E21B 34/063* (2013.01); *G06F 2217/16* (2013.01)

(56) References Cited

U.S. PATENT DOCUMENTS

| | | | |
|---|---|---|---|
| 2010/0113310 A1* | 5/2010 | Shepherd | E21B 33/13 507/219 |
| 2014/0019102 A1 | 1/2014 | Mitchell | |
| 2014/0019107 A1* | 1/2014 | Jiang | E21B 21/08 703/10 |
| 2014/0034390 A1 | 2/2014 | Mitchell | |
| 2014/0214326 A1 | 7/2014 | Samuel | |
| 2015/0088425 A1* | 3/2015 | Mitchell | G06F 17/5009 702/6 |

OTHER PUBLICATIONS

International Search Report and Written Opinion; PCT Application No. PCT/US2015/029689; dated Sep. 11, 2015.
French Search Report and Written Opinion; French Application No. 1563088; dated Feb. 21, 2018.

* cited by examiner

SIMULATING THE EFFECTS OF RUPTURE DISK FAILURE ON ANNULAR FLUID EXPANSION IN SEALED AND OPEN ANNULI

CROSS-REFERENCE TO RELATED APPLICATIONS

This Application claims priority from PCT Patent Application Serial No. PCT/US15/29689, filed on May 7, 2015, which claims priority from U.S. Provisional Patent Application Ser. No. 62/107,099, filed on Jan. 23, 2015, which are incorporated herein by reference.

STATEMENT REGARDING FEDERALLY SPONSORED RESEARCH

Not applicable.

FIELD OF THE DISCLOSURE

The present disclosure generally relates to systems and methods for simulating the effects of rupture disk failure on annular fluid expansion in sealed and open annuli. More particularly, the present disclosure relates to simulating the effects of rupture disk failure on annular fluid expansion in sealed and open annuli to mitigate annular pressure buildup in a wellbore.

BACKGROUND

The Bureau of Safety and Environment Enforcement new well design regulations address annular pressure buildup (APB) mitigation options. The use of a rupture disk is one option to relieve APB, which is quite common in deep-water wells. Manufactured to fail at a specific pressure difference with a very tight tolerance, rupture disks are installed in the casing walls to protect either the external or internal casing string. A rupture disk can be installed in a casing string interval, which is externally cemented. The rupture disk fails when the internal-external pressure difference exceeds its rating. The internal APB may be relieved through fluid movement into the pore space, micro-channels or fractures in the external cement section. Once the rupture disk fails in this situation, the rupture disk is identified as open (vented/leaked). Simulation of rupture disk failure effects on annular fluid expansion (AFE) analysis and casing load analysis can provide valuable information to assist wellbore tubular design.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by providing systems and methods for simulating the effects of rupture disk failure on annular fluid expansion in sealed and open annuli to mitigate annular pressure buildup in a wellbore.

In one embodiment, the present disclosure includes a method for simulating the effects of rupture disk failure on annular fluid expansion in a wellbore, which comprises: a) determining whether an internal region or an external region for a pair of casing string annuli is open; b) calculating at least one of an adjusted internal annular pressure buildup and an adjusted external annular pressure buildup for at least one of the internal annular region and the external annular region of the casing string annuli using initial fluid pressures for each annulus, at least one of an initial internal annular pressure buildup and an initial external annular pressure buildup, and one of i) the adjusted internal annular pressure buildup or the adjusted external annular pressure buildup; and ii) a volume change between a volume of the internal annular region and a volume of the external annular region; c) repeating steps a)-b) for each region in the casing string annuli; d) repeating steps a)-c) for each casing string annulus in a combined casing string; and e) repeating steps a)-d) using a computer processor until a global pressure equilibrium is achieved in the combined casing string.

In another embodiment, the present disclosure includes a non-transitory program carrier device tangibly carrying computer executable instructions for simulating the effects of rupture disk failure on annular fluid expansion in a wellbore, the instructions being executable to implement: a) determining whether an internal region or an external region for a pair of casing string annuli is open; b) calculating at least one of an adjusted internal annular pressure buildup and an adjusted external annular pressure buildup for at least one of the internal annular region and the external annular region of the casing string annuli using initial fluid pressures for each annulus, at least one of an initial internal annular pressure buildup and an initial external annular pressure buildup, and one of i) the adjusted internal annular pressure buildup or the adjusted external annular pressure buildup; and ii) a volume change between a volume of the internal annular region and a volume of the external annular region; c) repeating steps a) b) for each region in the casing string annuli; d) repeating steps a)-c) for each casing string annulus in a combined casing string; and e) repeating steps a)-d) until a global pressure equilibrium is achieved in the combined casing string.

In yet another embodiment, the present disclosure includes a non-transitory program carrier device tangibly carrying computer executable instructions for simulating the effects of rupture disk failure on annular fluid expansion in a wellbore, the instructions being executable to implement:

a) determining whether an internal region or an external region for a pair of casing string annuli is open; b) calculating an adjusted internal annular pressure buildup and an adjusted external annular pressure buildup for the internal annular region and the external annular region of the casing string annuli using initial fluid pressures for each annulus, an initial internal annular pressure buildup, an initial external annular pressure buildup, and one of i) the adjusted internal annular pressure buildup and the adjusted external annular pressure buildup; and ii) a volume change between a volume of the internal annular region and a volume of the external annular region, wherein the volume change is one of an initialized volume change and an adjusted volume change; c) repeating steps a)-b) for each region in the casing string annuli; d) repeating steps a)-c) for each casing string annulus in a combined casing string; and e) repeating steps a)-d) until a global pressure equilibrium is achieved in the combined casing string.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Simulating the effects of rupture disk failure on annular fluid expansion in sealed annuli follows a numerical technique. Simulating the effects of rupture disk failure on annular fluid expansion in open (vented/leaked) annuli follows an analytical technique. Both techniques may rely on one of the following pressure balance models, wherein subscripts are used for various parameters (e.g. 1 refers to an external annulus, 2 refers to an internal annulus, i refers to initial, f refers to final, and m refers to intermediate). As further used herein by different equations, APB may be represented as Pbld.

Piston Model

In this model, a piston is assumed to exist between the two annuli. When the disk ruptures due to pressure difference, fluid could be moved from the higher pressure side to the lower pressure side until the pressures are balanced. There is no fluid exchange due to piston isolation.

Actual: $P(T_i)$, $T_i \rightarrow P(T_m)$, $T_m$ disk fail, fluid exchange, pressure balance→$P(T_f)$, $T_f$,
    wherein $P(T_i) < P(T_m) < P(T_f)$, $T_i < T_m < T_f$
Model: $P(T_i)$, $T_i \rightarrow P'(T_f)$, $T_f$ disk fail→$P(T_f)$, $T_f$) piston move, pressure balance.

Figure 1:
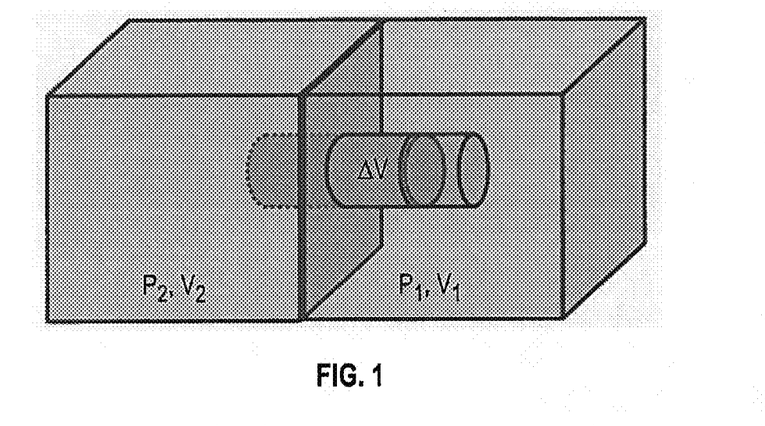
FIG. 1 is a piston model that may be used for pressure balance of an open rupture disk in multiple open or closed casing string annuli.

As shown in FIG. 1, a piston separates the fluids, but allows fluid displacement for pressure balance. If both internal and external annuli are sealed, then the volume change due to piston displacement is:

$$\Delta V = \Delta P \times \frac{c_2 V_1 \cdot c_1 V_2}{c_2 V_1 + c_1 V_2}, \quad (1)$$

wherein $\Delta P = P_2' - P_1'$ is the pressure difference across the rupture disk, $P_2'$ and $P_1'$ are internal and external pressures as if the disk is intact, $c_1$, $c_2$ are average fluid compressibility values, $\Delta V$ is the fluid volume change due to piston movement, and $V_1$, $V_2$ are annulus volumes assuming no casing ballooning effects.

After pressure balance, each final APB may be represented as:

$$Pbld_1 = Pbld_1' + (\Delta V/V_1)/c_1 \quad (2)$$

$$Pbld_2 = Pbld_2' - (\Delta V/V_2)/c_2 \quad (3)$$

wherein $Pbld_2$, $Pbld_1$ are the final APB of the internal and external annuli, respectively, and $Pbld_2'$, $Pbld_1'$ are the internal and external APB if the rupture disk did not fail.

If both annuli are directly or indirectly open, then:

$$Pbld_2 = Pbld_1 + P_{1i} - P_{2i} \quad (4)$$

wherein $Pbld_1$ is determined by boundary conditions or by further neighboring annulus pressures.

Fully Miscible Fluid Model

This model is intended for the internal and external fluids that are miscible.

Actual: $p(T_i)$, $T_i \rightarrow p(T_m)$, $T_m$ disk fails, fluid exchange, pressure balance→$p(T_f)$, $T_f$, wherein $T_i < T_m < T_f$ and $p(T_i) < p(T_m) < p(T_f)$
Model: $p(T_i)$, $T_i \rightarrow p'(T_f)$, $T_f$ disk fails, fluid fully mixed→p$(T_f)$, $T_f$, fluid volume change, pressure balance.

Figure 2:
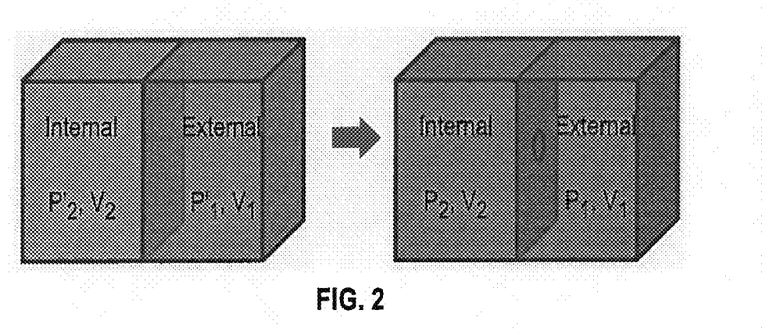
FIG. 2 is a fully miscible model that may be used for pressure balance of an open rupture disk in multiple open or closed casing string annuli.

After rupture disk failure, the density, compressibility, and coefficient of thermal expansion (CTE) of fluid in both annuli are assumed to be identical as shown in FIG. 2. For example, oil-based mud (OBM) with mud weight (MW)=17.5 ppg is fully mingled with 14.0 ppg OBM. The average MW, average compressibility, and average CTE are calculated as follows:

$$MW_{mix} = (MW_1 \times V_1 + MW_2 \times V_2)/(V_1 + V_2) \quad (5a)$$

$$c_{mix} = (c_1 \times V_1 + c_2 \times V_2)/(V_1 + V_2) \quad (5b)$$

$$CTE_{mix} = (CTE_1 \times V_1 + CTE_2 \times V_2)/(V_1 + V_2) \quad (5c)$$

If both annuli are sealed, then the mud weight mixture is used for calculations of AFE volume and APB. Assuming $P_2 > P_1$, $\Delta P = P_2' - P_1'$ and the traditional APB expression, then:

$$Pbld_1 = Pbld_1' + \Delta P \times V_2/(V_2 + V_1) \quad (6)$$

$$Pbld_2 = Pbld_2' - \Delta P \times V_1/(V_2 + V_1) \quad (7)$$

But the final pressure values are only accurate at the rupture disk location. Final pressures at other locations can be calculated using:

$$P(MD) = P@disk + 0.052 \times (TVD - TVD_{disk}) \times MW_{mix} \quad (8)$$

wherein P represents the pressure at the measured depth (P(MD)) and at the rupture disk location (P@disk), and TVD represents true vertical depth.

If one annulus is open, directly or indirectly, the pressure gradients will be different from the ones before the rupture disk fails. They should be calculated using mixture fluid density. Assuming the traditional APB expression and if fluid flows outward, then:

$$Pbld_2 = P_1(T_f)@disk - P_2(T_i)@disk \quad (9)$$

wherein $P_1(T_f)@disk = Pbld_1 + P_1(T_i)@top + 0.052 \times (TVD_{disk} - TVD_{top}) \times MW_{mix}$ for an open vented external annulus; and $P_1(T_f)@disk = P_{leak} + 0.052 \times (TVD_{leak} - TVD_{disk}) \times MW_{mix}$ for an open leaked external annulus.

If the external annulus is indirectly vented/leaked through another disk, then that disk can be treated as a leak-off point. The equation is similar for the case that fluid flows inward.

Fully Immiscible Fluid Model

Figure 3:
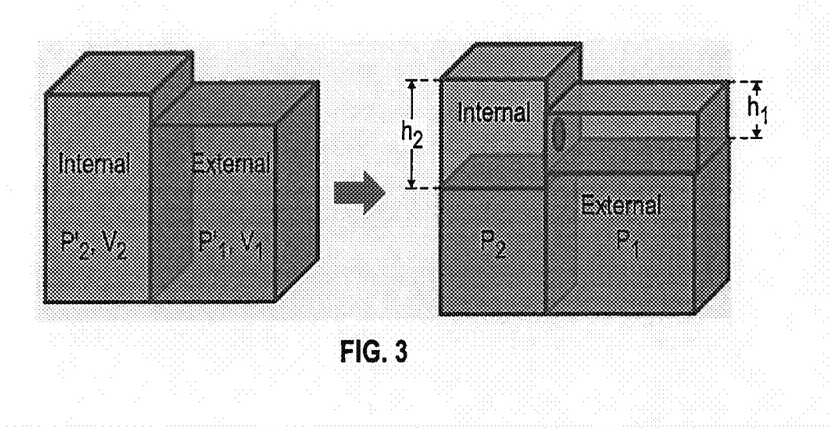
FIG. 3 is a fully immiscible model that may be used for pressure balance of an open rupture disk in multiple open or closed casing string annuli.
Figure 4A:
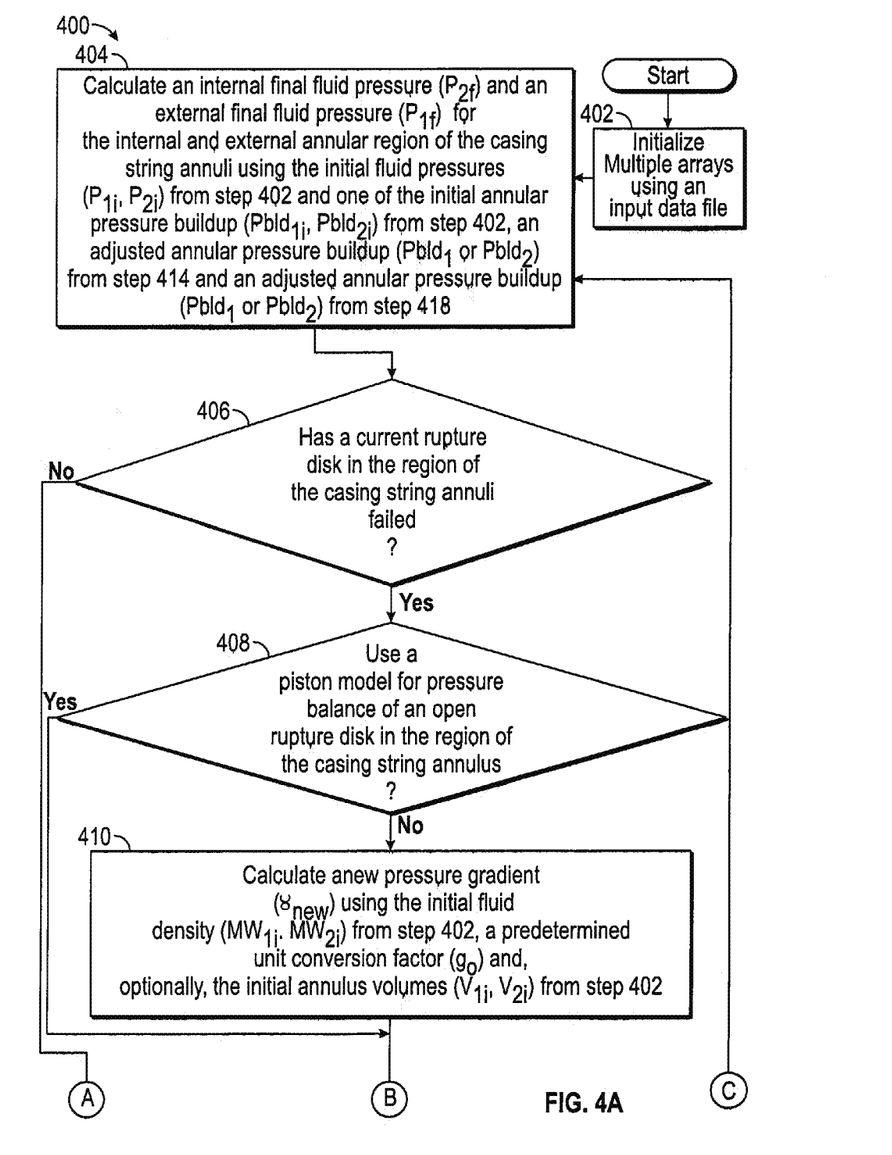
FIGS. 4A-4E are a flow diagram illustrating one embodiment of a method for implementing the present disclosure.
Figure 4B:
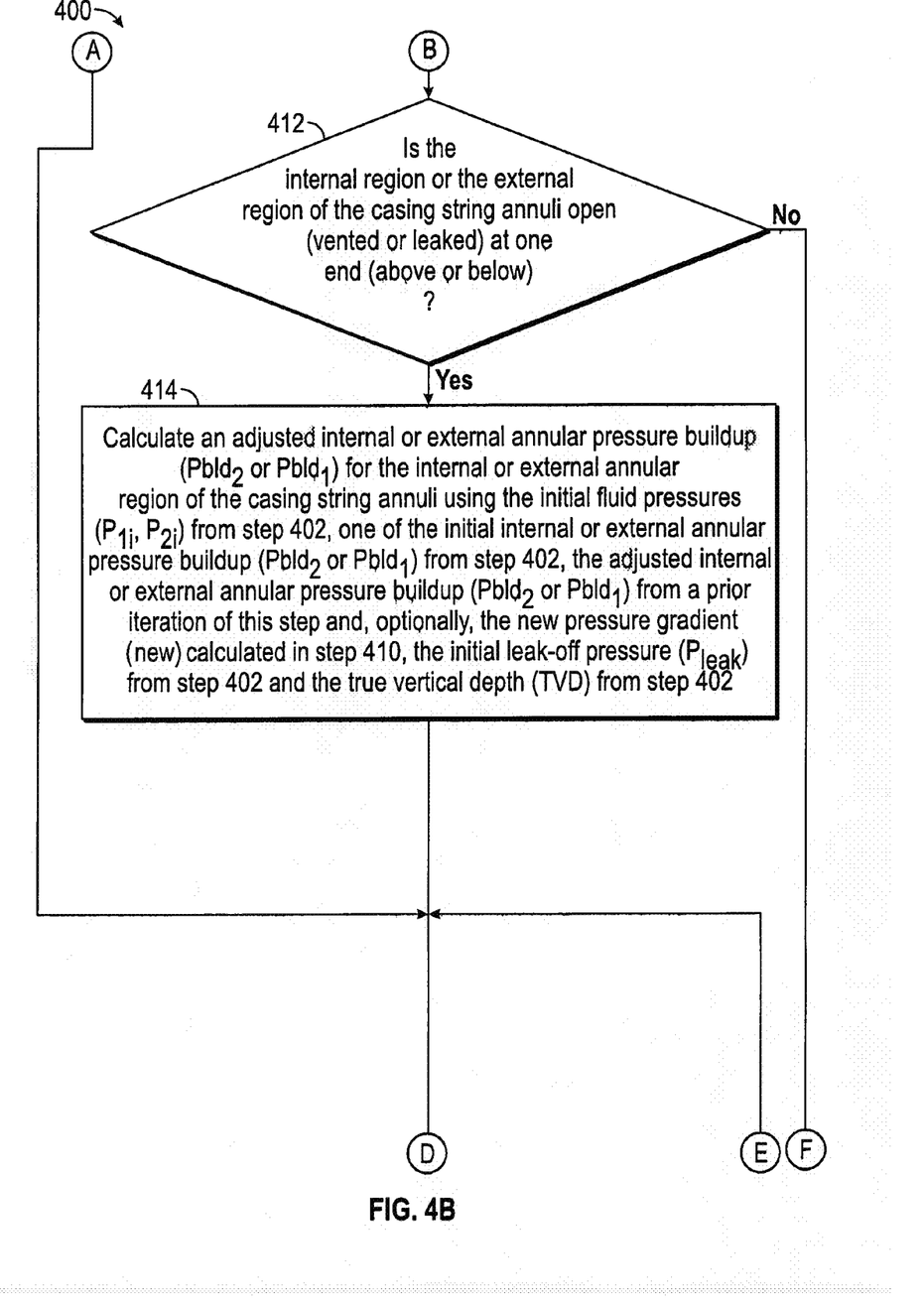
Figure 4C:
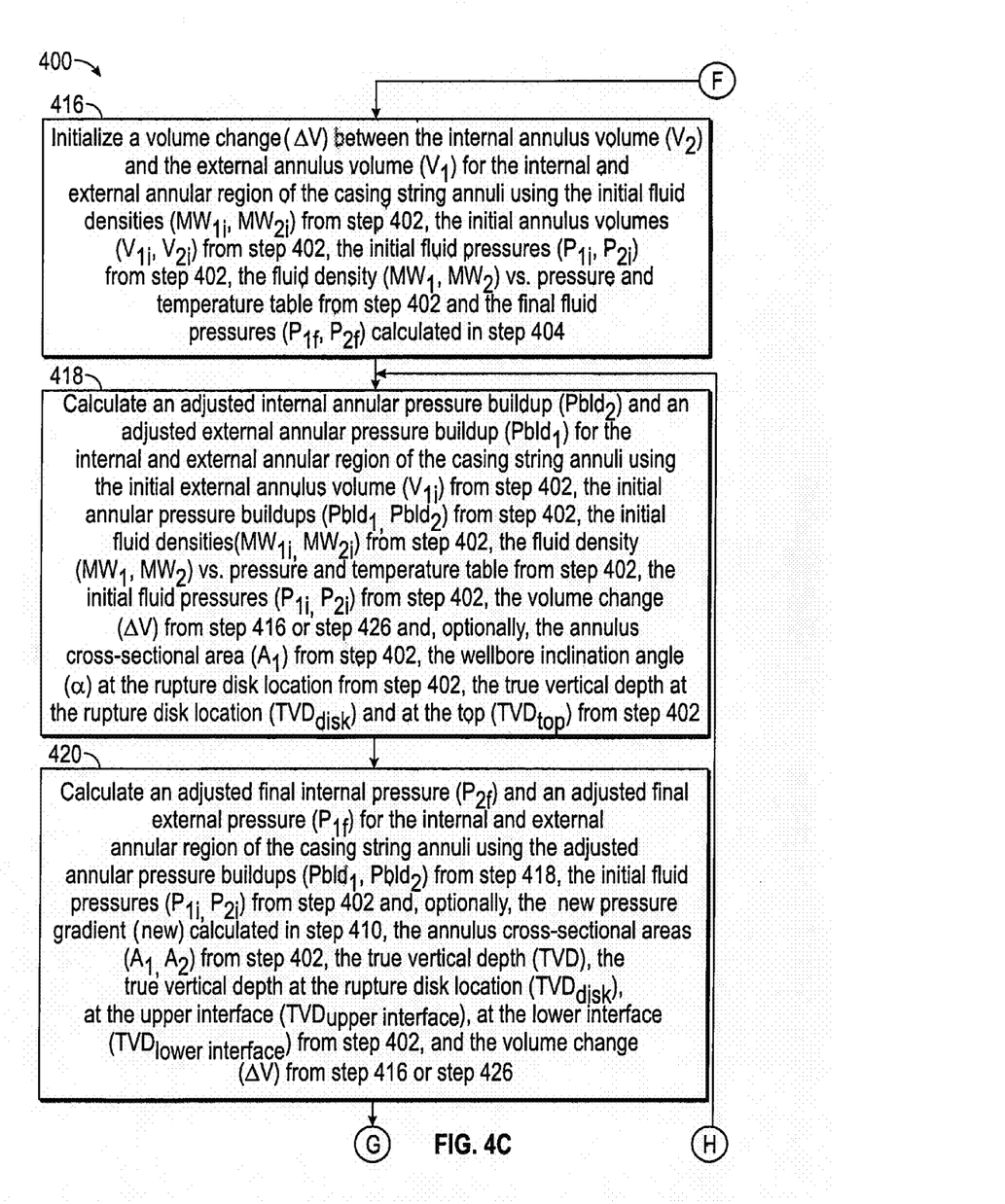
Figure 4D:
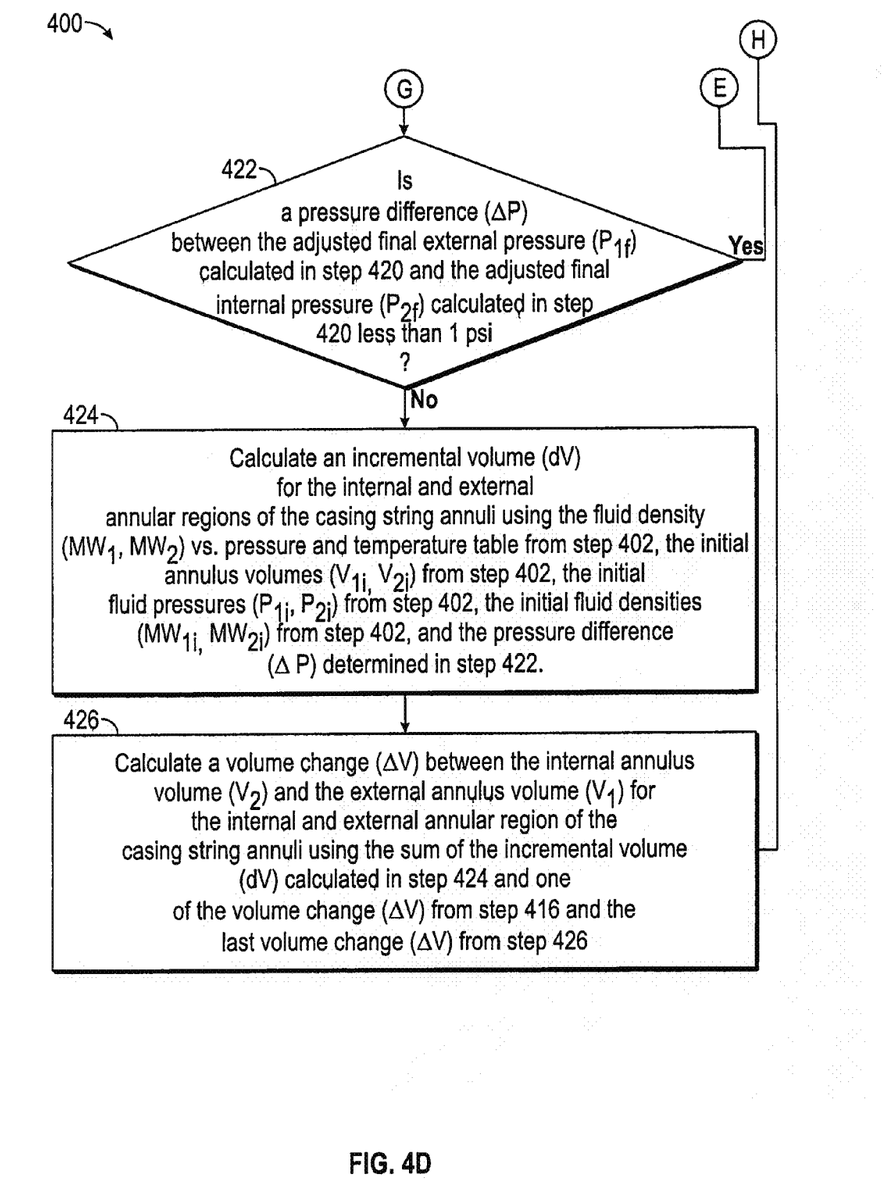
Figure 4E:
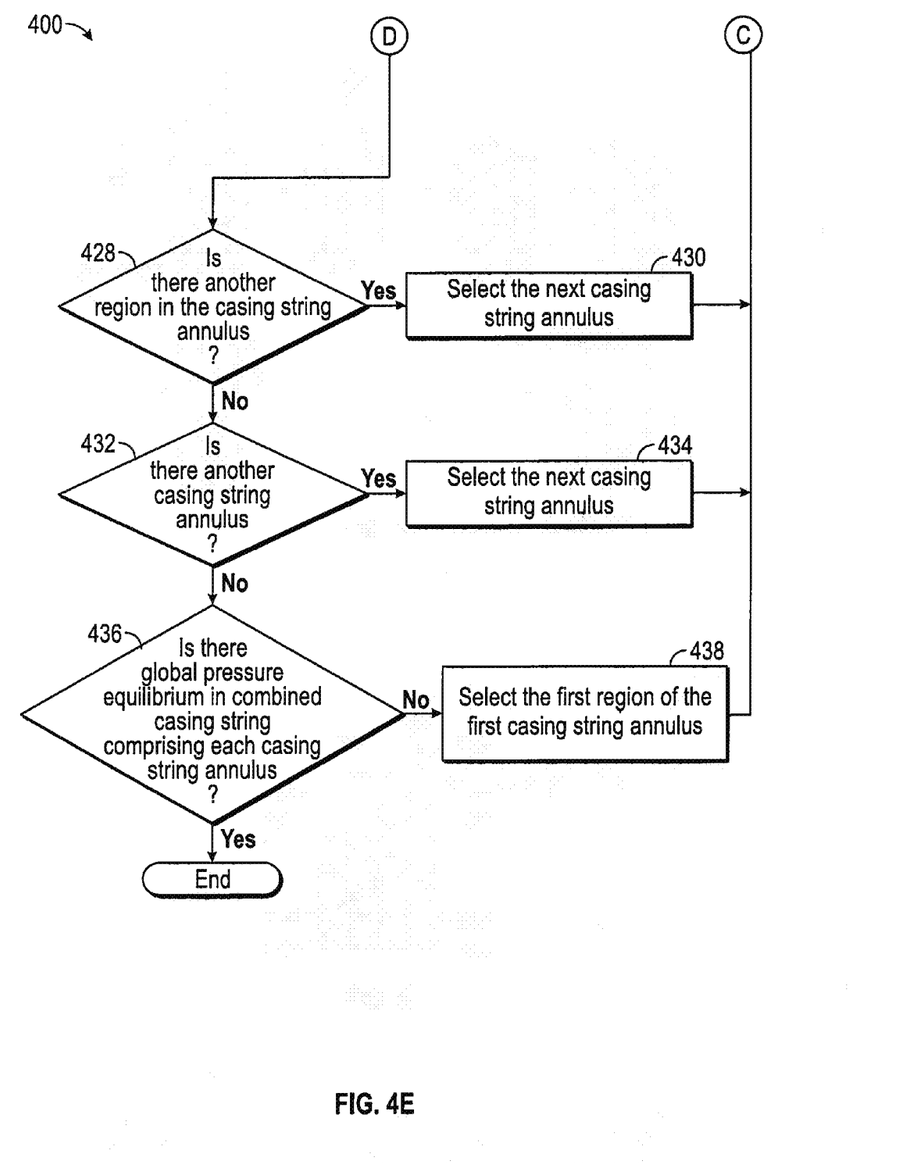

This model is intended for the internal and external annuli with different fluids. In this model, the fluids are assumed to be fully immiscible. Their properties are preserved even after fluid exchange. It is assumed that lighter fluid goes up and stays at the top of a neighboring annulus while heavier fluid goes down as shown in FIG. 3. A typical example is an OBM annulus connected with a water-based-mud (WBM) annulus through an open rupture disk.

Actual: $p(T_i)$, $T_i \to p(T_m)$, $T_m$ disk fails, fluid exchange, pressure balance $\to p(T_f)$, $T_f$, wherein $T_i < T_m < T_f$ and $p(T_i) < p(T_m) < p(T_f)$, $P(T)$ means pressure at temperature T.

Model: $p(T_i)$, $T_i \to p'(T_f)$, $T_f$ disk fails, fully immiscible fluids exchange $\to p(T_f)$, $T_f$, fluid volume is re-distributed, pressures are balanced.

If both annuli are sealed and $P_2 > P_1$; $MW_2 < MW_1$, then the fluid exchange will form a top liquid column with height $h_1$ in the external annulus (FIG. 3). Each APB ($Pbld_1$, $Pbld_2$) may be defined at the rupture disk location as:

$$Pbld_2 = P_2(T_f)_{disk} - P_2(T_i)_{disk}$$

$$Pbld_1 = P_1(T_f)_{disk} - P_i(T_i)_{disk}$$

The pressure balance at the rupture disk: $P_2(T_f) = P_1(T_f)$, is therefore:

$$Pbld_1 - Pbld_1' - (Pbld_2 - Pbld_2') = \Delta P = P_2' - P_1' \qquad (10)$$

the P-V change of internal fluid remaining in the internal annulus and expanded by $\Delta V_2$ is:

$$Pbld_2 - Pbld_2' - \Delta V_2/(A_2 h_2 - \Delta V_2)/c_2 \qquad (11)$$

the P-V change of internal fluid moved into the external annulus and expanded by $\Delta V_2$ is:

$$Pbld_2 - Pbld_2' = -\Delta V_1/(A_1 h_1 - \Delta V_1)/c_2 \qquad (12)$$

the P-V change of external fluid remaining in the external annulus is:

$$Pbld_1 - Pbld_1' + 0.052 \times MW_2 \times (TVD_{disk} - TVD_{1top} - h_1)$$
$$= \Delta V_1/(V_i - A_1 h_1 + \Delta V_1)/c_1 \qquad (13)$$

the P-V change of external fluid moved into the internal annulus is:

$$Pbld_1 - Pbld_1' + 0.052 \times MW_2 \times (TVD_{disk} - TVD_{2top} - h_2)$$
$$= \Delta V_2/(V_2 - A_2 h_2 + \Delta V_2)/c_1 \qquad (14)$$

and the geometry of total internal fluid expansion is:

$$\Delta V_1 + \Delta V_2 = A_1 h_1 + A_2 h_2 - V_2 \qquad (15)$$

Equations 10-15 can be solved for six unknown variables $Pbld_1$, $Pbld_2$, $h_1$, $h_2$, $\Delta V_1$, and $\Delta V_2$, but the solution could be quite complicated. The numerical technique of simulation may thus, be preferred to solve these variables.

If the external annulus is directly or indirectly open outbound, then the result is similar to that of the piston model. Assuming fluid flows outward:

$$Pbld_2 = P_{vent1} + P_1(T_1)@disk - P_2(T_1)@disk \qquad (16)$$

for an open vented external annulus and:

$$Pbld_2 = P_{leak} + 0.052 \times (TVD_{leak} - TVD_{disk}) \times MW_1 - P_2$$
$$(T_i)@disk \qquad (17)$$

for an open leaked external annulus.

If the external annulus is indirectly vented/leaked through another rupture disk, then that disk can be treated as a leak-off point. The equation is similar for the case that fluid flows inward. Equation 14 may need to be modified if $MW_2 > MW_1$ (i.e., invaded internal annulus fluid sets at the bottom of the external annulus). If only one or two annuli are involved and one annulus is vented or leaked, the maximum APB values can be calculated using a reverse calculation. If $Pbld_1$ then the external annulus is vented and the APB of the internal annulus is $Pbld_2 = -\Delta P = P_1' - P_2'$. The maximum internal annular pressure is:

$$P_{2max} = P_1' + rating \qquad (18)$$

Referring now to FIGS. 4A-4E, both the analytical technique and the numerical technique are incorporated into the method 400 for simulating the effects of rupture disk failure on annular fluid expansion in sealed and open annuli. The method 400 uses a pair-by-pair approach to achieve global pressure equilibrium.

In step 402, multiple arrays are initialized using an input data file and techniques well known in the art. The initialized arrays may include, for example: i) initial fluid pressures ($P_{1i}$, $P_{2i}$) at predetermined depths, initial mud weight, also referred to as fluid densities ($MW_{1i}$, $MW_{2i}$), final fluid densities ($MW_{1f}$, $MW_{2f}$), initial annulus volumes ($V_{1i}$, $V_{2i}$), initial annulus pressure buildups ($Pbld_{1i}$, $Pbld_{2i}$); and ii) a fluid density ($MW_1$, $MW_2$) vs. pressure and temperature table. The initialized arrays for i) are for each region in each casing string annulus. If an internal/external annulus is absent, then the initial fluid density ($MW_i$) and the initial annulus volume ($V_i$) are set to 0. Depending on the type of fluid and which model is used, the initialized arrays may also include initial leak-off pressure ($P_{leak}$), true vertical depth at an upper interface ($TVD_{upper\ interface}$), at a lower interface ($TVD_{lower\ interface}$), at the rupture disk location ($TVD_{disk}$), at the top ($TVD_{top}$), at the leak-off point ($TVD_{leak}$), at the bottom ($TVD_{bottom}$), annulus cross-section areas ($A_1$, $A_2$) and a wellbore inclination angle ($\alpha$) at the rupture disk location.

In step 404, an internal final fluid pressure ($P_{2f}$) and an external final fluid pressure ($P_{1f}$) are calculated for the internal and external annular region of the casing string annuli using the initial fluid pressures ($P_{1i}$, $P_{2i}$) from step 402 and one of the initial annular pressure buildup ($Pbld_{1i}$, $Pbld_{2i}$) from step 402 and an adjusted annular pressure buildup ($Pbld_1$ or $Pbld_2$) from step 414. The internal final pressure ($P_{2f}$), if not updated in step 420, is calculated by adding the initial internal pressure ($P_{2i}$) and one of the initial internal annular pressure buildup ($Pbld_{2i}$) from step 402 and the adjusted internal annular pressure buildup ($Pbld_2$) from step 414. The external final pressure ($P_{1f}$), if not updated in step 420, is calculated by adding the initial external pressure ($P_{1i}$) and one of the initial external annular pressure buildup ($Pbld_{1i}$) from step 402 and the adjusted external annular pressure buildup ($Pbld_1$) from step 414.

In step 406, the method 400 determines if a current rupture disk in the region of the casing string annuli failed using the final pressures ($P_{1f}$, $P_{2f}$) calculated in step 404 and techniques well known in the art. If the current rupture disk in the region of the casing string annulus has not failed, then the method 400 proceeds to step 428. Otherwise, the method 400 proceeds to step 408.

In step 408, the method 400 determines whether to use a piston model for pressure balance of an open rupture disk in the region of the casing string annulus based on the type of fluid in the internal and external annular regions of the casing string annuli. If the piston model should be used, then the method 400 proceeds to step 412. Otherwise, the method 400 proceeds to step 410 to calculate a new pressure gradient to use in connection with the miscible fluid model or the immiscible fluid model.

In step 410, a new pressure gradient ($\gamma_{new}$) is calculated using the initial fluid density ($MW_{1i}$, $MW_{2i}$) from step 402, a predetermined unit conversion factor ($g_o$) and, optionally, the initial annulus volumes ($V_{1i}$, $V_{2i}$) from step 402 when a miscible fluid model is required. If an immiscible fluid model is required, then the new pressure gradient may be calculated for each fluid using $\gamma_{new1}=MW_{2i}*(g_o)$ and $\gamma_{new2}=MW_{1i}*(g_o)$. If however, a miscible fluid model can be used, then the new pressure gradient may be calculated for the miscible fluid using $\gamma_{new}=MW_{mix} \times (g_o)$ wherein $MW_{mix}=(MW_{1i} \times V_{1i}+MW_{2i} \times V_{2i})/(V_{1i}+V_{2i})$.

In step 412, the method 400 determines whether the internal region or the external region of the casing string annuli is open (vented or leaked) at one end (above or below) using the input data file from step 402 and techniques well known in the art. If the internal region and the external region of the casing string annuli are closed, then the method 400 proceeds to step 416. Otherwise, the method 400 proceeds to step 414.

In step 414, an adjusted internal or external annular pressure buildup ($Pbld_2$ or $Pbld_1$) is calculated for the internal or external annular region of the casing string annuli using the initial fluid pressures ($P_{1i}$, $P_{2i}$) from step 402, one of the initial internal or external annular pressure buildup ($Pbld_2$ or $Pbld_1$) from step 402, the adjusted internal or external annular pressure buildup ($Pbld_2$ or $Pbld_1$) from a prior iteration of this step and, optionally, the new pressure gradient ($\gamma_{new}$) calculated in step 410, the initial leak-off pressure ($P_{leak}$) from step 402 and the true vertical depth (TVD) from step 402 when a miscible or an immiscible fluid model is used. The following equations are illustrative and assume that the external annular pressure buildup ($Pbld_1$) from step 402 or the adjusted external annular pressure buildup ($Pbld_1$) from a prior iteration of this step is known.

Piston Model:

$$Pbld_2=Pbld_1+P_{1i}-P_{2i}$$

Miscible Model:

$$P_1(T_f)@disk=Pbld_1+P_{1i}@top+\gamma_{new1} \times (TVD_{disk}-TVD_{top}) \text{ for a vented external annulus; or}$$

$$P_1(T_f)@disk=P_{leak}+\gamma_{new} \times (TVD_{leak}-TVD_{disk}) \text{ for a leaked external annulus.}$$

$$Pbld_2=P_1(T_f)@disk-P_{2i}$$

Immiscible Model:
For indirectly vented/leaked external annulus:

$$Pbld_2=Pbld_1+P_{1i}-P_{2i}$$

for a directly-vented external annulus:

$$Pbld_2=Pbld_1+P_{1i}@bottom+\gamma_{new1} \times (TVD_{bottom}-TVD_{disk})-P_{2i}$$

for a directly-leaked external annulus:

$$Pbld_2=P_{leak}+\gamma_{new1} \times (TVD_{leak}-TVD_{disk})-P_{2i}$$

In step 416, a volume change ($\Delta V$) between the internal annulus volume ($V_2$) and the external annulus volume ($V_1$) is initialized for the internal and external annular region of the casing string annuli using the initial fluid densities ($MW_{1i}$, $MW_{2i}$) from step 402, the initial annulus volumes ($V_{1i}$, $V_{2i}$) from step 402, the initial fluid pressures ($P_{1i}$, $P_{2i}$) from step 402, the fluid density ($MW_1$, $MW_2$) vs. pressure and temperature table from step 402 and the final fluid pressures ($P_{1f}$, $P_{2f}$) calculated in step 404. The initialized volume change $(\Delta V)=dp\_rupt*c_1*c_2*V_{1i}*V_{2i}/(c_1*V_{2i}+c_2*V_{1i})$, wherein $dp\_rupt=(P_{2f})=(P_{1f})$ and $$c_1=(MW_1(P_{1i}+10 \text{ psi})-MW_{1i})/MW_{1i}/10 \text{ psi}$$

$$c_2=(MW_2(P_{2i}+10 \text{ psi})-MW_{2i})/MW_{2i}/10 \text{ psi}$$

$MW_1$ and $MW_2$ are a function of pressure and may be determined by linear interpolation using the fluid density ($MW_1$, $MW_2$) vs. pressure and temperature table from step 402.

In step 418, an adjusted internal annular pressure buildup ($Pbld_2$) and an adjusted external annular pressure buildup ($Pbld_1$) are calculated for the internal and external annular region of the casing string annuli using the initial external annulus volume ($V_{1i}$) from step 402, the initial annular pressure buildups ($Pbld_1$, $Pbld_2$) from step 402, the initial fluid densities ($MW_{1i}$, $MW_{2i}$) from step 402, the fluid density ($MW_1$, $MW_2$) vs. pressure and temperature table from step 402, the initial fluid pressures ($P_{1i}$, $P_{2i}$) from step 402, the volume change ($\Delta V$) from step 416 or step 426 and, optionally, the annulus cross-sectional area ($A_1$) from step 402, the wellbore inclination angle ($\alpha$) at the rupture disk location from step 402, the true vertical depth at the rupture disk location ($TVD_{disk}$) and at the top ($TVD_{top}$) from step 402 when the immiscible fluid model is required. If a volume change ($\Delta V$) has been calculated in step 426, then it is used instead of the volume change ($\Delta V$) from step 416.

$$MW_{1i}=f(P_{1i})$$

$$MW_1=f(P_{1i}+Pbld_1)$$

$$MW_{2i}=f(P_{2i})$$

$$MW_2=f(P_{2i}+Pbld_2)$$

$$V_1=f_1(V_{1i},Pbld_1,Pbld_2)$$

$$V_2=f_2(V_{2i},Pbld_1,Pbld_2)$$

$MW_1$, $MW_2$ and $MW_{mix}$ are a function of pressure and may be determined by linear interpolation using the fluid density ($MW_1$, $MW_2$) vs. pressure and temperature table from step 402.

Piston model:

$$MW_1 \times (V_1+\Delta V)=MW_{1i} \times V_1$$

$$MW_2 \times (V_2-\Delta V)=MW_{2i} \times V_2$$

Miscible fluid model:

$$MW_{mix}=(MW_1 \times V_1+MW_2 \times V_2)/(V_1+V_2)$$

$$MW_{mix}@(P_{1i}+Pbld_1) \times (V_1+\Delta V)=MW_{mix}@(P_{1i}) \times V_1$$

$$MW_{mix}@(P_{2i}+Pbld_2) \times (V_2-\Delta V)=MW_{mix}@(P_{2i}) \times V_2$$

Immiscible fluid model:

$$Pbld_1=Pbld_2+P_{2i}-P_{1i}+0.052 \times MW_2 \times (TVD_{disk}-TVD_{top1}-\Delta V \times \cos \alpha/A_1)$$

$$1.0+V_2 \times (MW_{2i}/MW_2-1.0)/V_1=MW_{1i}/MW_{1@}(P_{1i}+Pbld_1)$$

In step 420, an adjusted final internal pressure ($P_{2f}$) and an adjusted final external pressure ($P_{1f}$) are calculated for the internal and external annular region of the casing string annuli using the adjusted annular pressure buildups ($Pbld_1$, $Pbld_2$) from step 418, the initial fluid pressures ($P_{1i}$, $P_{2i}$) from step 402 and, optionally, the new pressure gradient ($\gamma_{new}$) calculated in step 410, the annulus cross-sectional areas ($A_1$, $A_2$) from step 402, the true vertical depth (TVD), the true vertical depth at the rupture disk location ($TVD_{disk}$), at the upper interface ($TVD_{upper\ interface}$), at the lower interface (TVD$_{lower\ interface}$) from step 402, and the volume change (ΔV) from step 416 or step 426 depending on the model used and the location of the adjusted final internal and external final pressures (P$_{2f}$, P$_{1f}$) that are calculated. If the volume change (ΔV) has been calculated in step 426, then it is used instead of the volume change (ΔV) from step 416. Piston model and other models at rupture disk location:

$$P_{1f}=P_{1i}+Pbld_1$$

$$P_{2f}=P_{2i}+Pbld_2$$

Miscible fluid model at other locations:

$$P_{1f}@MD=P_{2f}@MD=P_{2i}@disk+Pbld_2+\gamma_{new}\times(TVD-TVD_{disk})$$

Immiscible fluid model at other locations:
Assuming MW$_2$<MW$_1$, then pressures above the upper fluid interface at measured depth MD$_{top1}$+ΔV/A$_1$ $$P_{1f}=P_{2f}=P_{2i}+Pbld_2$$

Between upper fluid interface and lower fluid interface at measured depth MD$_{bottom,2}$−ΔV$_{12}$/A$_2$, where ΔV$_{12}$=V$_2$×(MW$_{2,i}$/MW$_{2,f}$−1.0)+ΔV.

$$P_{2f}=P_{2i}+Pbld_2$$

$$P_{1f}=P_{2i}@upper\ interface+Pbld_2+\gamma_{new2}\times(TVD-TVD_{upper\ interface})$$

Below the lower fluid interface:

$$P_{1f}=P_{2i}@upper\ interface+Pbld_2+\gamma_{new2}\times(TVD-TVD_{upper\ interface})$$

$$P_{2f}@MD=P_{2i}@lower\ interface+Pbld_2+\gamma_{new2}\times(TVD-TVD_{lower\ interface})$$

In step 422, the method 400 determines if a pressure difference (ΔP) between the adjusted final external pressure (P$_{1f}$) calculated in step 420 and the adjusted final internal pressure (P$_{2f}$) calculated in step 420 is less than 1 psi. If the pressure difference (ΔP) is less than 1 psi, then the method 400 proceeds to step 428. Otherwise, the method 400 proceeds to step 424.

In step 424, an incremental volume (dV) is calculated for the internal and external annular regions of the casing string annuli using the fluid density (MW$_1$, MW$_2$) vs. pressure and temperature table from step 402, the initial annulus volumes (V$_{1i}$, V$_{2i}$) from step 402, the initial fluid pressures (P$_{1i}$, P$_{2i}$) from step 402, the initial fluid densities (MW$_{1i}$, MW$_{2i}$) from step 402, and the pressure difference (ΔP) determined in step 422. The incremental volume (dV)=feedback*ΔP, wherein feedback=$c_1$*$c_2$*V$_{1i}$*V$_{2i}$/($c_1$*V$_{2i}$+$c_2$*V$_{1i}$) and $$c_1=(MW_1(P_{1i}+10\ psi)-MW_{1i})/MW_{1i}/10\ psi$$

$$c_2=(MW_2(P_{2i}+10\ psi)-MW_{2i})/MW_{2i}/10\ psi$$

MW$_1$ and MW$_2$ are a function of pressure and may be determined by linear interpolation using the fluid density (MW$_1$, MW$_2$) vs. pressure and temperature table from step 402.

In step 426, a volume change (ΔV) between the internal annulus volume (V$_2$) and the external annulus volume (V$_1$) is calculated for the internal and external annular region of the casing string annuli using the sum of the incremental volume (dV) calculated in step 424 and one of the volume change (ΔV) from step 416 and the last volume change (ΔV) from step 426. If a volume change (ΔV) has been calculated in this step, then it is used instead of the volume change (ΔV) from step 416. The method 400 returns to step 418 after this step to calculate another adjusted internal and external annular pressure buildup (Pbld$_2$, Pbld$_1$) for the internal and external annular region of the casing string annuli.

In step 428, the method 400 determines if there is another region in the casing string annulus using techniques well known in the art. If there is not another region in the casing string annulus, then the method 400 proceeds to step 432. Otherwise, the method 400 proceeds to step 430.

In step 430, the next region in the casing string annulus is selected and the method 400 returns to step 404. Steps 404-428 are thus, repeated for each region in the casing string annulus until there are no more regions in the casing string annulus.

In step 432, the method 400 determines if there is another casing string annulus using techniques well known in the art. If there is not another casing string annulus, then the method 400 proceeds to step 436. Otherwise, the method 400 proceeds to step 434.

In step 434, the next casing string annulus is selected and the method 400 returns to step 404. Steps 404-432 are thus, repeated for each casing string annulus until there are no more casing string annuli.

In step 436, the method 400 determines if there is global pressure equilibrium in the combined casing string comprising each casing string annulus. If there is not a global pressure equilibrium in the combined casing string, then the method 400 proceeds to step 438. Otherwise, the method 400 ends. Global pressure equilibrium may be achieved when i) the difference between the last adjusted annular pressure buildup (Pbld$_1$, Pbld$_2$) from step 414 or the last adjusted annular pressure buildup (Pbld$_1$, Pbld$_2$) from step 418 and the next to last adjusted annular pressure buildup (Pbld$_1$, Pbld$_2$) from step 414 or the next to last adjusted annular pressure buildup (Pbld$_1$, Pbld$_2$) from step 418 is near zero (e.g. conveyance); and ii) all other forces applied to the combined casing string are balanced.

In step 438, the first region of the first casing string annulus is selected and the method 400 returns to step 404 and repeats steps 404-436 until there is a global pressure equilibrium in the combined casing string.

Figure 5:
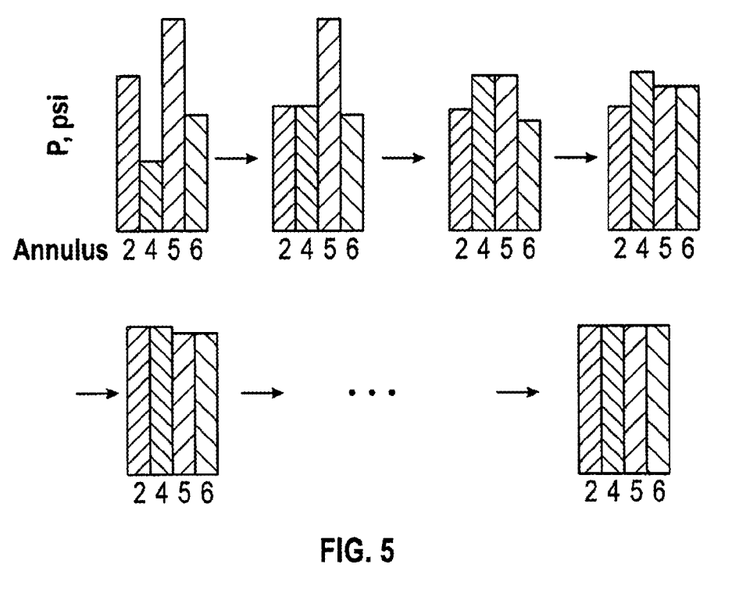
FIG. 5 is a chart illustrating a pair-by-pair pressure balance of multiple annuli according to the method in FIGS. 4A-4E.

As shown in FIG. 5, the method 400 balances the pressure of two connected fluid regions at a time. For each pair of fluid regions, the volume change (ΔV) is used as a feedback variable. Different pressure gradients may be included in the pressure balance equations when the fully miscible model or the fully immiscible fluid model is required. After one or more iterations of the method 400, global pressure equilibrium can be reached.

Figure 6:
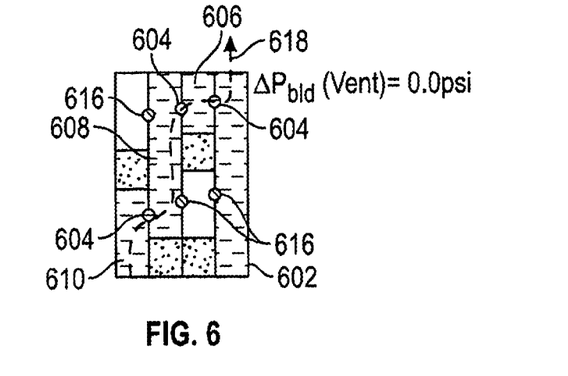
FIG. 6 is a schematic diagram illustrating multiple annuli for an exemplary wellbore connected by multiple open rupture disks.

Global pressure equilibrium in the combined casing string may thus, be performed using the analytical technique or the numerical technique. The analytical technique (steps 410, 414) thus, requires at least one open annulus connected to another annulus through one or more open rupture disks. In FIG. 6, for example, the top region of annulus 602 is open and connected through open rupture disks 604 to annuli 606, 608 and 610. The fluid path 618 passes through annuli 602, 606, 608 and 610. Rupture disks 616 are closed. The status (vented/leaked or sealed) of each AFE region may be determined in this manner. Conversely, the numerical technique (steps 410 and 416-426) does not require at least one open annulus.

The analytical technique is usually fast in terms of computation. But for sealed and connected AFE regions in one or more annuli, the annulus fluid volumes (V1 and V2) in equations (1-12) change with annulus pressures due to casing-ballooning effects. As a result, the analytical technique may not be practical and valid. Moreover, if three or more sealed AFE regions are connected through open rupture disks, it is very difficult to solve those pressure balance equations using the analytical technique.

EXAMPLE

Figure 7:
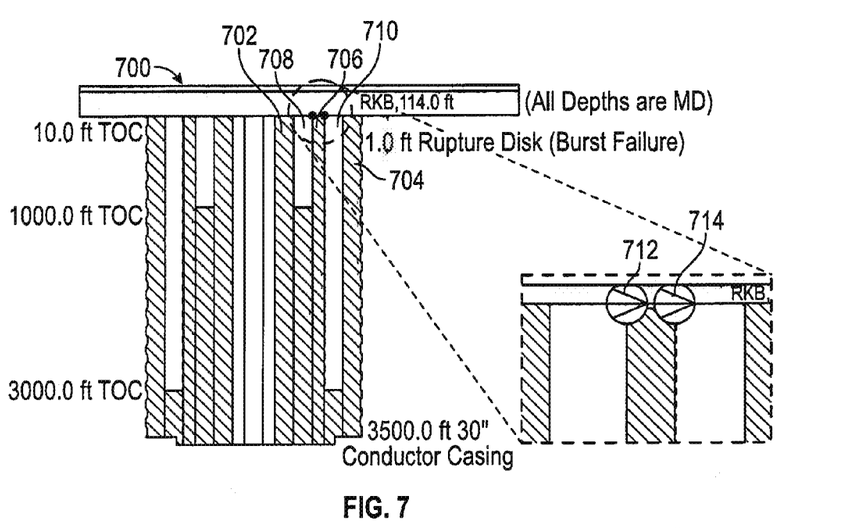
FIG. 7 is a schematic diagram illustrating an exemplary wellbore for simulation of pressure balance between two connected annuli.

Referring now to FIG. 7, a schematic diagram of an exemplary wellbore is illustrated with multiple annuli. The $2^{nd}$ annulus 702 and the $6^{th}$ annulus 704 are completely cemented. The $4^{th}$ annulus 706 is almost completely cemented, leaving a very narrow space (10 ft) at the top (TOC) as seen in the exploded view. Two trapped AFE regions ($3^{rd}$ and $5^{th}$ annuli) 708, 710 are connected through two open rupture disks 712, 714 and the very shallow fluid passage in the $4^{th}$ annulus 706. In this wellbore, the casing ballooning effects are negligible for the $3^{rd}$ and $5^{th}$ annuli 708, 710. Therefore, the analytical technique is practical and acceptable. To simplify the calculation, initial fluid temperatures and final fluid temperature are set as identical from top to bottom. Table 2 compares the simulated APB results for the wellbore in FIG. 7 using the numerical technique and as calculated using MS Excel. The APB values from the numerical technique agree very well with those from the MS Excel calculation.

TABLE 2

| I.D., in. | O.D., in. | length, ft | AP Psi (MS Excel) | APB Psi (Numerical technique) | Diff., psi | Diff. % |
|---|---|---|---|---|---|---|
| 13.52 | 18.40 | 500 | 15558.9 | 15570 | −11.1 | −0.07% |
| 24.03 | 29.04 | 3000 | 15558.9 | 15567 | −8.1 | −0.05% |

The method 400 will thus, help casing design engineers to design their wells with confident safety margins at acceptable costs.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. WellCat™, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Figure 8:
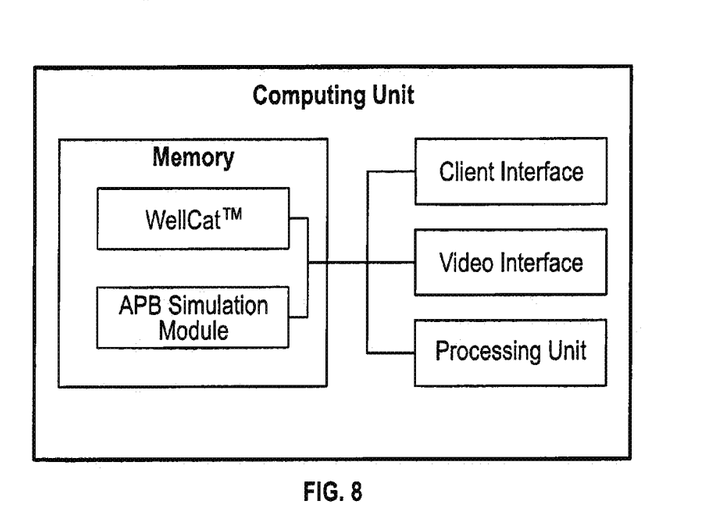
FIG. 8 is a block diagram illustrating one embodiment of a computer system for implementing the present disclosure.

Referring now to FIG. 8, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-7. The memory therefore, includes an APB simulation module, which enables steps 410-426 described in reference to FIGS. 4A-4D. The APB simulation module may integrate functionality from the remaining application programs illustrated in FIG. 8. In particular, WellCat™ may be used as an interface application to perform steps 402-408 and 428-436 in FIGS. 4A and 4E. Although WellCat™ may be used as interface application, other interface applications may be used, instead, or the APB simulation module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for simulating the effects of rupture disk failure on annular fluid expansion in a wellbore, the method comprising:
   a) determining whether an internal region or an external region for a pair of casing string annuli is open;
   b) calculating at least one of an adjusted internal annular pressure buildup and an adjusted external annular pressure buildup for at least one of the internal annular region and the external annular region of the casing string annuli using initial fluid pressures for each annulus, at least one of an initial internal annular pressure buildup and an initial external annular pressure buildup, and one of i) the adjusted internal annular pressure buildup or the adjusted external annular pressure buildup; and ii) a volume change between a volume of the internal annular region and a volume of the external annular region;
   c) repeating steps a)-b) for each region in the casing string annuli, wherein the casing string annuli comprises at least one open annulus connected to another annulus through one or more open rupture disks installed in a casing string;
   d) repeating steps a)-c) for each casing string annulus in a combined casing string; and
   e) repeating steps a)-d) using a computer processor until a global pressure equilibrium is achieved in the combined casing string.

2. The method of claim 1, wherein the volume change is one of an initialized volume change and an adjusted volume change.

3. The method of claim 2, wherein the initialized volume change is calculated for the internal annular region and the external annular region of the casing string annuli using initial fluid densities for each annulus, initial volumes for each annulus, the initial fluid pressures for each annulus and final fluid pressures for each annulus.

4. The method of claim 2, wherein the adjusted volume change is calculated for the internal annular region and the external annular region of the casing string annuli using a sum of an incremental volume and one of the initialized volume change and a last adjusted volume change.

5. The method of claim 4, wherein the incremental volume is calculated for the internal annular region and the external annular region of the casing string annuli using initial volumes for each annulus, the initial fluid pressures for each annulus, the initial fluid densities for each annulus and a pressure difference between an adjusted final external pressure for the external annular region and an adjusted final internal pressure for the internal annular region.

6. The method of claim 5, wherein the adjusted final internal pressure and the adjusted final external pressure are calculated using the adjusted internal annular pressure buildup, the adjusted external annular pressure buildup and the initial fluid pressures.

7. The method of claim 6, further comprising repeating the calculation of the adjusted volume change until the pressure difference is less than 1 psi.

8. The method of claim 3, wherein the initialized volume change is calculated by:

$$\Delta V = P_{2f} - P_{1f} * c_1 c_2 * V_{1i} * V_{2i}/(c_1 * V_{2i} + c_2 * V_{1i})$$

$$c_1 = (MW_1(P_{1i} + 10 \text{ psi}) - MW_{1i})/MW_{1i}/10 \text{ psi}$$

$$c_2 = (MW_2(P_{2i} + 10 \text{ psi}) - MW_{2i})/MW_{2i}/10 \text{ psi}$$

wherein $P_{1f}$, $P_{2f}$ are the final fluid pressures for each annulus, $V_{1i}$, $V_{2i}$ are the initial volumes for each annulus, $P_{1i}$, $P_{2i}$ are the initial fluid pressures for each annulus $MW_{1i}$, $MW_{2i}$ are the initial fluid densities for each annulus, and $MW_1$, $MW_2$ are fluid densities for each annulus as a function of pressure.

9. The method of claim 5, wherein the incremental volume is calculated by:

$$dV = [c_1 * c_2 * V_{1i} * V_{2i}/(c_1 * V_{2i} + c_2 * V_{1i})] * \Delta P$$

$$c_1 = (MW_1(P_{1i} + 10 \text{ psi}) - MW_{1i})/MW_{1i}/10 \text{ psi}$$

$$c_2 = (MW_2(P_{2i} + 10 \text{ psi}) - MW_{2i})/MW_{2i}/10 \text{ psi}$$

wherein $P_{1i}$, $P_{2i}$ are the initial fluid pressures for each annulus, $V_{1i}$, $V_{2i}$ are the initial volumes for each annulus $MW_{1i}$, $MW_{2i}$ are the initial fluid densities for each annulus, and $MW_1$, $MW_2$ are fluid densities for each annulus as a function of pressure.

10. A non-transitory program carrier device tangibly carrying computer executable instructions for simulating the effects of rupture disk failure on annular fluid expansion in a wellbore, the instructions being executable to implement:
   a) determining whether an internal region or an external region for a pair of casing string annuli is open;
   b) calculating at least one of an adjusted internal annular pressure buildup and an adjusted external annular pressure buildup for at least one of the internal annular region and the external annular region of the casing string annuli using initial fluid pressures for each annulus, at least one of an initial internal annular pressure buildup and an initial external annular pressure buildup, and one of i) the adjusted internal annular pressure buildup or the adjusted external annular pressure buildup; and ii) a volume change between a volume of the internal annular region and a volume of the external annular region;

c) repeating steps a)-b) for each region in the casing string annuli, wherein the casing string annuli comprises at least one open annulus connected to another annulus through one or more open rupture disks installed in a casing string;

d) repeating steps a)-c) for each casing string annulus in a combined casing string; and e) repeating steps a)-d) until a global pressure equilibrium is achieved in the combined casing string.

11. The program carrier device of claim 10, wherein the volume change is one of an initialized volume change and an adjusted volume change.

12. The program carrier device of claim 11, wherein the initialized volume change is calculated for the internal annular region and the external annular region of the casing string annuli using initial fluid densities for each annulus, initial volumes for each annulus, the initial fluid pressures for each annulus and final fluid pressures for each annulus.

13. The program carrier device of claim 11, wherein the adjusted volume change is calculated for the internal annular region and the external annular region of the casing string annuli using a sum of an incremental volume and one of the initialized volume change and a last adjusted volume change.

14. The program carrier device of claim 13, wherein the incremental volume is calculated for the internal annular region and the external annular region of the casing string annuli using initial volumes for each annulus, the initial fluid pressures for each annulus, the initial fluid densities for each annulus and a pressure difference between an adjusted final external pressure for the external annular region and an adjusted final internal pressure for the internal annular region.

15. The program carrier device of claim 14, wherein the adjusted final internal pressure and the adjusted final external pressure are calculated using the adjusted internal annular pressure buildup, the adjusted external annular pressure buildup and the initial fluid pressures.

16. The program carrier device of claim 15, further comprising repeating the calculation of the adjusted volume change until the pressure difference is less than 1 psi.

17. The program carrier device of claim 12, wherein the initialized volume change is calculated by:

$$\Delta V = P_{2f} - P_{1f} * c_1 c_2 * V_{1i} * V_{2i}/(c_1 * V_{2i} + c_2 * V_{1i})$$

$$c_1 = (MW_1(P_{1i}+10 \text{ psi}) - MW_{1i})/MW_{1i}/10 \text{ psi}$$

$$c_2 = (MW_2(P_{2i}+10 \text{ psi}) - MW_{2i})/MW_{2i}/10 \text{ psi}$$

wherein $P_{1f}$, $P_{2f}$ are the final fluid pressures for each annulus, $V_{1i}$, $V_{2i}$ are the initial volumes for each annulus, $P_{1i}$, $P_{2i}$ are the initial fluid pressures for each annulus $MW_{1i}$, $MW_{2i}$ are the initial fluid densities for each annulus, and $MW_1$, $MW_2$ are fluid densities for each annulus as a function of pressure.

18. The program carrier device of claim 14, wherein the incremental volume is calculated by:

$$dV = [c_1 * c_2 * V_{1i} * V_{2i}/(c_1 * V_{2i} + c_2 * V_{1i})] * \Delta P$$

$$c_1 = (MW_1(P_{1i}+10 \text{ psi}) - MW_{1i})/MW_{1i}/10 \text{ psi}$$

$$c_2 = (MW_2(P_{2i}+10 \text{ psi}) - MW_{2i})/MW_{2i}/10 \text{ psi}$$

wherein $P_{1i}$, $P_{2i}$ are the initial fluid pressures for each annulus, $V_{1i}$, $V_{2i}$ are the initial volumes for each annulus $MW_{1i}$, $MW_{2i}$ are the initial fluid densities for each annulus, and $MW_1$, $MW_2$ are fluid densities for each annulus as a function of pressure.

19. A system comprising:

at least one casing string in a subterranean wellbore, the at least one casing string having one or more rupture disks installed and wherein the at least one casing string comprises at least one open annulus connected to another annulus through one or more open rupture disks installed in the casing string; and at least one processor in communication with the acoustic logging tool, wherein the processor is coupled with a non-transitory computer-readable storage medium having stored therein instructions which, when executed by the at least one processor, causes the at least one processor to:

a) determine whether an internal region or an external region for a pair of casing string annuli is open;

b) calculate an adjusted internal annular pressure buildup and an adjusted external annular pressure buildup for the internal annular region and the external annular region of the casing string annuli using initial fluid pressures for each annulus, an initial internal annular pressure buildup, an initial external annular pressure buildup, and one of i) the adjusted internal annular pressure buildup and the adjusted external annular pressure buildup; and ii) a volume change between a volume of the internal annular region and a volume of the external annular region, wherein the volume change is one of an initialized volume change and an adjusted volume change;

c) repeat steps a)-b) for each region in the casing string annuli;

d) repeat steps a)-c) for each casing string annulus in a combined casing string; and e) repeat steps a)-d) until a global pressure equilibrium is achieved in the combined casing string.

20. The system of claim 19, wherein the initialized volume change is calculated for the internal annular region and the external annular region of the casing string annuli using initial fluid densities for each annulus, initial volumes for each annulus, the initial fluid pressures for each annulus and final fluid pressures for each annulus.

* * * * *